(No Model.)

C. W. SKEELS.
DIGGING AND STABLE FORK.

No. 568,962. Patented Oct. 6, 1896.

Witnesses:
A. R. Appleman Jr.
A. M. Wilson

Inventor.
Chas. W. Skeels.
By Henry C. Evert
his Atty

UNITED STATES PATENT OFFICE.

CHARLES W. SKEELS, OF NEW CUMBERLAND, OHIO.

DIGGING AND STABLE FORK.

SPECIFICATION forming part of Letters Patent No. 568,962, dated October 6, 1896.

Application filed September 17, 1895. Serial No. 562,771. (No model.)

*To all whom it may concern:*

Be it known that I, CHARLES W. SKEELS, a citizen of the United States of America, residing at New Cumberland, in the county of Tuscarawas and State of Ohio, have invented certain new and useful Improvements in Digging and Stable Forks, of which the following is a specification, reference being had to the accompanying drawings.

This invention relates to certain new and useful improvements in digging and stable forks, and relates more particularly to that class of implements known as "diggers."

The invention has for its object the construction of a digger that may be advantageously employed in the lifting of potatoes and like vegetables, and whereby the work may be performed much more easily and quickly than were the ordinary spade or fork used for this purpose.

A further object of the invention is the construction of a digger of the above-referred-to class that will be simple in its construction, strong, durable, effectual in its operation, and comparatively inexpensive to manufacture.

With the above and other objects in view the invention finally consists in the novel construction, combination, and arrangement of parts to be hereinafter more particularly described, and specifically pointed out in the claim.

In describing the invention in detail reference is had to the accompanying drawings, forming a part of this specification, and wherein like figures of reference indicate similar parts throughout both views, in which—

Figure 1:
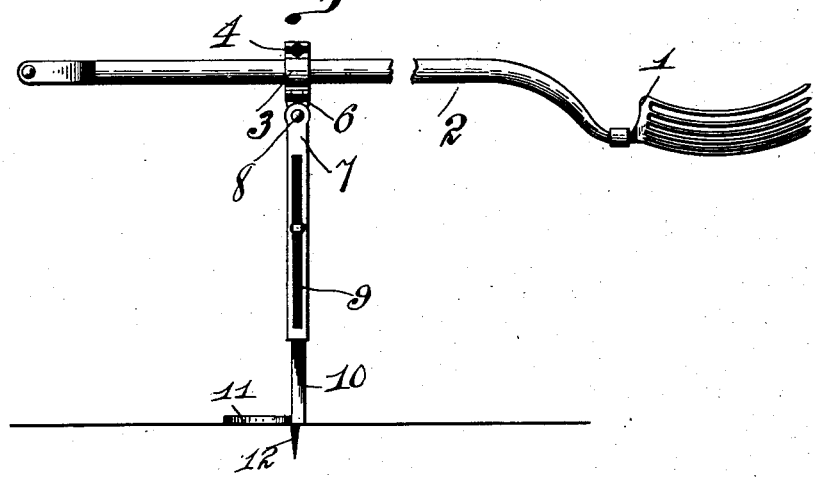
Figure 2:
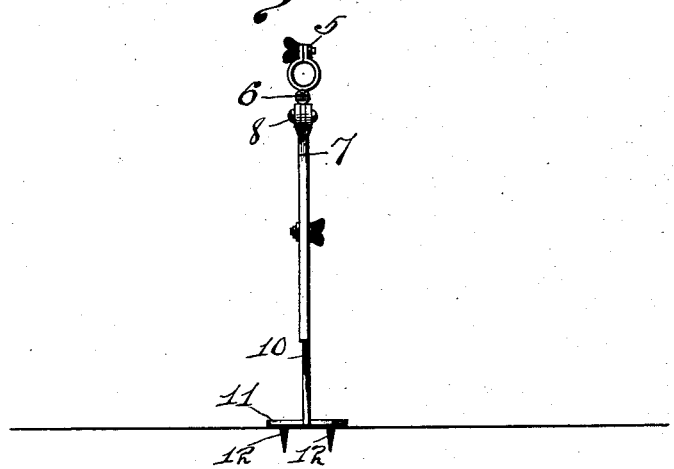

Figure 1 is a perspective view of my improved digger. Fig. 2 is a detail view of the attachment.

In the drawings, 1 indicates a fork or pronged spade, which is provided with a suitable handle 2. Attached to the handle 2 is an adjustable clamp 3, which is secured thereto by a bolt 4 and nut 5. The clamp 3 is further provided with a hinged portion 6 and is secured to an adjustable brace 7 by a bolt or rivet 8. The brace 7 is provided with a slot 9, and is further provided with a groove adapted to receive an auxiliary brace 10, which is secured at its lower end to a base-plate 11, which is provided with projections 12 12. A set-screw or adjustable bolt is carried in the slot 9 and through the auxiliary brace 10.

The operation of my improved digger will be readily apparent. The base-plate 11 is placed on the ground and the projections 12 12 will serve to retain same in position and prevent it from slipping. The fork is then tilted forward and downward and forced into the ground to the desired depth beside the vegetables it is desired to lift, and pressure is then brought to bear on the top of the handle 2. The brace 7 and auxiliary brace 10 will form a rest for the handle and thus produce a leverage on the same. It will be noted that by reason of this leverage the vegetables can be lifted from the ground much more readily than in the ordinary manner. When the vegetables have been lifted from the ground, the dirt can be sifted through the prongs of the fork and the vegetables left thereon, when they can be deposited in a receptacle provided therefor or disposed of as desired by the operator. It will be noted that the leverage thus provided will be a considerable advantage and will lessen to a very great extent the labor involved in this kind of work.

It will also be noted that various changes may be made in the details of construction of my improved digger without departing from the general spirit of my invention.

Having fully described my invention, what I claim as new, and desire to secure by Letters Patent, is—

In an agricultural implement, a fork having a suitable handle, an adjustable clamp secured to the handle of the fork, said clamp consisting of semicircular sections hinged together at the bottom and having a shank by which it is secured in position, a brace 7 to which the shank of the clamp is secured, said brace having a slot 9 and groove as described, an auxiliary brace 10 slidable in the groove, a set-screw slidable in the brace to secure the auxiliary brace in any adjusted position, and a base-plate having securing projections, said base supporting the auxiliary brace as and for the purpose specified.

In testimony whereof I affix my signature in presence of two witnesses.

CHARLES W. SKEELS.

Witnesses:
METTA WALTZ,
THERESA WALTZ.